Oct. 1, 1935.    J. R. WINTER    2,015,831
GREASE SEAL
Filed Feb. 2, 1933
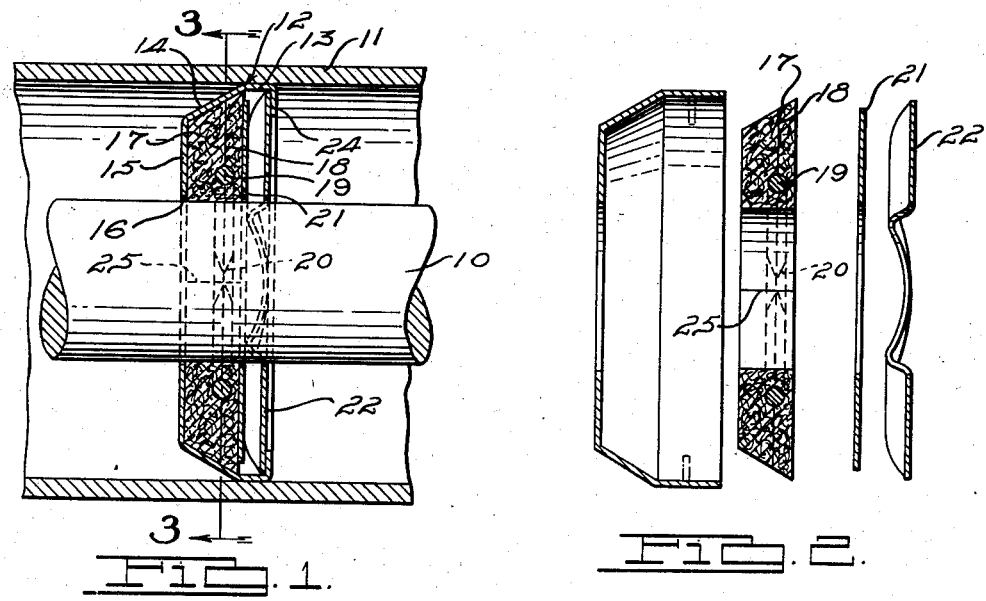
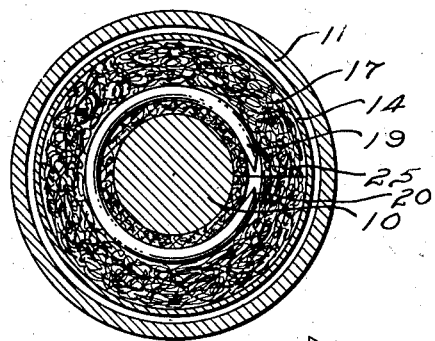
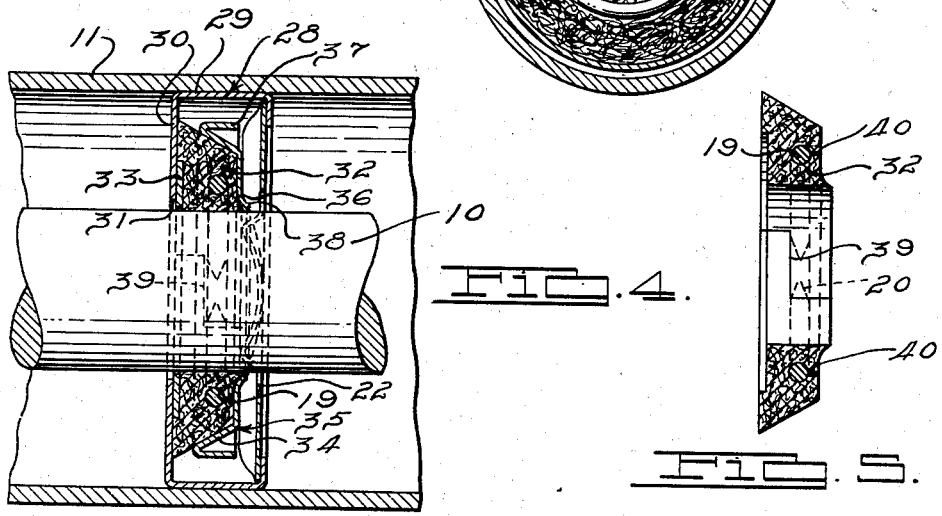
INVENTOR
John R. Winter.
BY
Haines, Dickey, Pierce & Hann.
ATTORNEYS.

Patented Oct. 1, 1935

2,015,831

UNITED STATES PATENT OFFICE 2,015,831

GREASE SEAL

John R. Winter, Detroit, Mich.

Application February 2, 1933, Serial No. 654,892

11 Claims. (Cl. 286—5)

This invention relates to grease or lubricant seals principally for use in conjunction with rotary shafts and in certain respects is related to the grease seal incorporated in my application for patent, Serial No. 638,802, filed October 20, 1932.

The object of the invention is to provide an improved grease seal of economical construction, which will more efficiently prevent the passage of grease or lubricant along a shaft or other rotary member, into spaces where it is not desired to have grease or lubricant.

Other objects of the invention will become apparent from the following specification, relating to a particular embodiment of the invention and from the claims hereinafter set forth.

For a better understanding of the invention, reference may be had to the accompanying drawing forming a part of the specification wherein:

Figure 1 is a longitudinal and fragmentary cross-sectional view illustrating a shaft and a grease seal associated therewith which is constructed according to one form of the invention.

Fig. 2 illustrates the seal as shown by Figure 1 with the parts thereof as seen prior to assembling the seal.

Fig. 3 is a cross-sectional view on a smaller scale taken substantially along the line 3—3 of Fig. 1.

Fig. 4 is a cross-sectional view similar to that shown by Fig. 1, illustrating a floating type of seal constructed according to the invention.

Fig. 5 is a vertical cross-sectional view of the sealing ring particularly showing the joint between the ends of the ring.

Referring to Fig. 1, a rotary shaft is indicated at 10 and a tubular housing therefor is indicated at 11. The grease seal comprises an annular, metallic casing 12 constructed of sheet metal, having a cylindrical portion 13 which fits tightly against the inner surface of the housing 11. The casing also includes a conical or axially tapered wall 14 which joins at its smaller end, a radial wall 15 having an opening 16 which is slightly larger than the shaft to permit free rotation of the latter with respect to the casing. The sealing ring 17 is composed of deformable sealing material such as felt, leather or other suitable packing, and extends around the shaft 10 and engages the end wall 15 and has a tapered periphery engaging the tapered wall 14. Between its side edges, the sealing ring may be slit circumferentially as indicated at 18 for receiving a split contractile wire or band 19 which normally contracts the sealing ring against the shaft. It will be noted that the slit is normally closed over the wire or band 19 and that the latter is near the shaft so as to readily contract a portion of the sealing ring against the latter. This slit might also be formed axially in either radial face of the sealing material, and preferably in the face at the lubricant side of the seal. If formed in the radial face, entry of the wire ring would be somewhat facilitated and also contractile action of the wire ring would be resisted less by the sealing ring since the wire ring would urge a relatively thin portion against the shaft, which is separated by the slit from the outer portion of the sealing material, at least on one axial side of the wire ring. The ends of the ring 19 are pointed as indicated at 20, to facilitate movement of one past the other if the ring contracts sufficiently to necessitate overlapping of its ends.

At that end of the sealing ring opposite the wall 15 of the casing, a sheet metal disc 21 is provided and this disc is engaged by a resilient ring 22 which is waved circumferentially in serpentine fashion to provide resiliency in the ring. The resilient ring 22 is held in place and resiliently against the disc 21 by an inwardly turned flange 24 at the end of the cylindrical portion 13 of the casing. The sealing ring may be annular or it may be split as particularly illustrated in Fig. 2 at 25.

The contractile ring or band 19 urges the sealing ring directly and radially against the shaft, therefore insuring a positive and constant engagement of the ring with the shaft regardless of rotary movement of the latter. The resilient ring 22 applies axial pressure against the sealing ring and urges it against and along the conical portion or wall 14 and against the end wall 15 of the casing. Movement of the sealing ring against the conical wall 14 and along it, additionally causes contraction of the ring against the shaft but it will be appreciated also that engagement of the sealing ring with the conical portion strongly and positively seals the casing against the passage of grease or lubricant at this point. In view of the fact that the seal is very positive radially inward of the contractile ring 19, and along the walls 14 and 15, and that the casing is tightly fitted in the tubular housing, grease or lubricant at the right side of the seal is positively prevented from escaping to the space at the left side of the seal. Furthermore, it will be observed that the sealing ring is forcefully confined at practically all points, and this is of importance as it increases the density of the felt and accordingly renders it less absorbent to lubricant.

In actual practice it has been found that a seal of this character, owing to its strong and positive points of sealing, is more efficient for the prevention of escape of lubricant or grease into parts where grease or lubricant is not desired. Particularly the grease seal has been found to be very efficient under extreme temperature and shaft speed conditions where the ordinary seal breaks down because of the temperature and speed of the shaft and permits some lubricant or grease to escape.

In the construction shown by Fig. 4, the grease seal includes an annular casing 28 having a cylindrical portion 29 tightly fitting in the housing 11, and a radial end wall 30 provided with a central opening 31 for receiving the shaft 10, but it will be noted that this opening is somewhat larger than the shaft to permit radial floating of the latter with respect to the casing. The sealing ring indicated at 32 engages the end wall 30 and includes an anti-friction washer 33, such as one composed of compressed fiber or metal which is embedded in the sealing material along an inner radial portion of the wall. It will be noted that the opening in this anti-friction washer is smaller than the opening 31 in the wall 30 and that it extends to a point closely adjacent to the outer periphery of the shaft, thus preventing any extrusion of the sealing material through the opening in the washer and along the shaft. The outer surface of the ring 32 is tapered and engages a tapered portion 34 of a ring 35 which also has a radial portion 36 engaging the opposite end face of the sealing ring. The outer edge of the tapered portion 34 terminates in a reversely bent portion 37, which renders the ring more rigid, and such portion 37 may terminate in substantially radial alignment with the portion 36.

The inner edge of the radial portion 36 terminates in an axially inclined flange 38 terminating closely adjacent to the shaft, and the sealing material extends between this inclined flange and the shaft. It will be appreciated that this wedge-shaped portion or conical lip of the sealing material between the flange 38 and the shaft terminates in a more or less sharp edge at the right side of the seal which may be maintained closely against the shaft more easily because of the sharp edge, thus rendering it easy to prevent lubricant at the right side of the seal from seeping between the outer periphery of the shaft and the sealing ring.

The ring 35 may be readily stamped from sheet metal to form the portions 34, 36 and 38 and the portion 37 which may be radial at first, may then be bent into the position shown.

For urging the ring 35 axially, and hence its tapered portions 34 and 38 and its radial portion 36 against corresponding portions of the sealing ring 32, one of the resilient rings 22 is employed, and this ring is maintained in the casing by turning in the end edge of the cylindrical portion 29 in substantially the manner described with respect to Fig. 1.

In the event radial, floating movement of the shaft occurs, the sealing ring with its anti-friction washer 33, and the ring 35 will float radially with the shaft and with respect to the casing and resilient ring 22. The fairly close fit between the anti-friction washer and the shaft, and close proximity of the axial flange 38 to the shaft, prevents extrusion of the sealing material through the openings in these members and axially along the shaft. The anti-friction washer reduces frictional resistance of the end wall 30 to floating of the sealing ring, while outwardly of this washer, the sealing material forcefully engages such end wall and maintains a seal at this point. The contractile ring 19 maintains a very positive seal against the shaft while the inclined flange 38 reduces the sealing material to a sharp edge maintained closely against the shaft at the lubricant side of the seal. The tapered portion 34 of the ring 35 also assists in urging the sealing material radially as the ring is urged axially by the resilient ring 22. It will, therefore, be appreciated that strong forces are utilized axially and radially, and that at localized points the seal is very strongly maintained against the end wall 30 and the shaft. Actual experiments have determined that providing the sharp edge portion of the sealing material under the flange 38 of ring 35, results in a much better seal as it positively prevents any possible initial seeping of lubricant between the sealing ring and the shaft.

The sealing material may be composed of felt, treated with a suitable binder and which is then molded to shape. It may also be composed of other suitable materials such as leather molded to shape. Where leather is used, it is preferred to dampen it or soak it in water so as to render it pliable and then mold it to the shape desired, and upon drying of the leather and then removal from the mold, it will be appreciated that the ring will maintain its molded shape. The leather also might be soaked in hot, melted paraffin and molded while allowing the paraffin to cool before removal from the mold. Preferably, the sealing material is substantially rectangular in cross section at first and is molded to the desired shape by a two part mold. Molding of the material under considerable pressure, not only causes it to maintain its shape but reduces porosity and increases the density of the material and thus renders it much less absorbent to lubricant.

It has also been found desirable to have the ends of the sealing ring overlapping as shown at 39 in Fig. 5 in a manner somewhat similar to the overlapping of the ends of a piston ring. These overlapping ends may be cemented together so as to avoid any crevices or they may be only fitted together. In the event during operation of the seal, the sealing ring should tend to contract circumferentially, as may tend to occur for example, in the case of a leather ring operating under higher temperature conditions, the cement will hold the ends of the ring together but even if the cemented connection should break, the circumferential overlap of the ends of the ring will prevent leakage of lubricant through any crevices at the ends of the ring. Where a cemented connection is not employed, the overlap of course would also prevent leakage of any lubricant through any crevices at the ends of the ring, even though circumferential contraction of the ring occur.

In this construction the circumferential slit for inserting ring 19 is shown as formed in the radial face of the sealing ring at the lubricant side as indicated at 40, although it could be formed as shown in Fig. 1, if desired. Particularly where leather is used, the slit as shown in Fig. 5 is preferred as the latter may harden somewhat in use. It will be appreciated that having the slit at this point, renders it easier for the wire ring 19 to forcefully hold the portion of the sealing ring radially inward of the slit, against the shaft, and also renders it easier to obtain the sharp edge seal under flange 38.

In molding the sealing ring the wire 19 is inserted into the unmolded material through the slit, and also the overlapping cut at the ends of the ring is formed. Then upon molding as described, the sealing ring as shown by Fig. 5 is obtained.

It might be stated at this time that the sealing ring shown by Fig. 1 may also have ends overlapping as described with respect to Fig. 5, and that it may be composed of the same materials described with respect to the latter ring. Also the sealing ring shown by Fig. 1 with the wire ring 19 and overlapping ends, may be molded as above described.

In general a grease seal provided according to the invention has been found to be highly efficient and more practical in operation than seals that have been used previously. Actual tests have determined the great utility of the seal particularly under operating conditions which would be extremely detrimental to the ordinary seal that has been used prior to the invention. Moreover practically all of the parts can be manufactured by stamping them from cheap metal, thereby reducing the expense of manufacture considerably.

While more than one form of the invention has been illustrated and described in detail, it will be apparent to those skilled in the art that various modifications may be made without departing from the scope of the appended claims.

I claim:

1. A grease seal comprising a sealing ring composed of deformable material and having a circumferentially extending slit, and circumferentially extending spring means disposed in the slit, the free edge portions of the slit material being substantially together to encase said means.

2. A grease seal comprising a shaft, a sealing ring extending around and engaging the shaft, said ring being composed of deformable material and having a circumferentially extending slit in one end face extending substantially into the body of the ring, and circumferentially extending, radially contractile means in the slit and normally urging the material at the radially inner side of the slit into forceful engagement with the shaft.

3. A grease seal comprising a shaft, a sealing ring extending around and engaging the shaft and being composed of deformable material, said ring having one end face portion tapering to substantially a sharp edge at the shaft periphery, circumferentially extending means embedded in the sealing ring adjacent said edge and normally acting to contract the ring about the shaft, and means engaging such tapered portion to maintain the edge closely against the shaft.

4. A grease seal comprising a shaft, a sealing ring extending around and engaging the shaft and being composed of deformable material, said ring having one end face portion tapering to substantially a sharp edge at the shaft periphery, resilient means normally contracting the sealing ring against the shaft adjacent said edge, and means for applying a localized pressure to the edge portion to maintain it closely against the shaft.

5. A grease seal comprising a shaft, a sealing ring extending around and engaging the shaft and being composed of deformable material, said ring having one end face portion tapering to substantially a sharp edge at the shaft periphery, circumferentially extending spring means normally contracting the sealing ring about the shaft adjacent said edge, and means for applying a localized pressure against the edge to maintain it closely against the shaft.

6. A grease seal comprising a rotary shaft, a casing around the shaft and having an end wall extending toward the shaft, a deformable sealing ring encircling the shaft and engaging it and the end wall, means extending circumferentially of the sealing ring for normally urging it into contact with the shaft, other means for normally urging the sealing ring against the end wall, said ring having an end face portion opposite the end wall, tapering to a substantially sharp edge at the shaft periphery, and means for normally applying localized pressure to such edge to maintain it closely against the shaft.

7. A grease seal comprising a rotary shaft, a casing around the shaft and having an end wall extending toward the shaft, a deformable sealing ring encircling the shaft and engaging it and the end wall, means extending circumferentially of the sealing ring for normally urging it into contact with the shaft, other means for normally urging the sealing ring against the end wall, said ring having an end face portion opposite the end wall, tapering to a substantially sharp edge at the shaft periphery, and means for normally applying localized pressure to such edge to maintain it closely against the shaft, said circumferentially extending means being embedded in and encased by the sealing ring material.

8. A grease seal comprising a rotary shaft, a casing around the shaft and having an end wall extending toward the shaft, a deformable sealing ring encircling the shaft and engaging it and the end wall, means extending circumferentially of the sealing ring for normally urging it into contact with the shaft, other means for normally urging the sealing ring against the end wall, said ring having an end face portion opposite the end wall, tapering to a substantially sharp edge at the shaft periphery, and means for normally applying localized pressure to such edge to maintain it closely against the shaft, said circumferentially extending means being embedded in and encased by the sealing ring material, and being nearer the inner periphery thereof so as to apply radial pressure to a thin portion of the ring.

9. A grease seal comprising a rotary shaft, a casing around the shaft and having an end wall extending toward the shaft, a deformable sealing ring encircling the shaft and engaging it and the end wall, means extending circumferentially of the sealing ring for normally urging it into contact with the shaft, other means for normally urging the sealing ring against the end wall, said ring having an end face portion opposite the end wall, tapering to a substantially sharp edge at the shaft periphery, and means for normally applying localized pressure to such edge to maintain it closely against the shaft, said circumferentially extending means being embedded in and encased by the sealing ring material, and being adjacent said edge and nearer the inner periphery of the sealing ring so as to apply radial pressure to a thin portion of the ring adjacent such edge.

10. A grease seal comprising a rotary shaft, a casing around the shaft and having an end wall directed toward the shaft, a sealing ring extending around and engaging the shaft and end wall and being composed of deformable material, that side of the ring axially opposite the end wall having a lip engaging the shaft, resilient means pressing the ring against the end wall and applying localized pressure to the lip to hold it positively against the shaft, and resilient means applying a radially contractile pressure to the sealing ring adjacent the lip.

11. A grease seal comprising a rotary shaft, a casing around the shaft and having an end wall directed toward the shaft, a sealing ring extending around and engaging the shaft and end wall and being composed of deformable material, that side of the ring axially opposite the end wall having a lip engaging the shaft, resilient means pressing the ring against the end wall and applying localized pressure to the lip to hold it positively against the shaft, and resilient means applying a radially contractile pressure to the sealing ring adjacent the lip, said last mentioned resilient means being embedded in the sealing ring closely adjacent to its inner periphery and axially adjacent the lip to the end that two forces will be localizing pressure on the sealing material adjacent the lip to make a positive seal at this point with the shaft.

JOHN R. WINTER.